Jan. 3, 1939.                H. F. SLOCUM                2,142,290
DUCT RODDING EQUIPMENT
Filed Dec. 24, 1937

INVENTOR
H. F. Slocum
BY William R. Willard
ATTORNEY

Patented Jan. 3, 1939

2,142,290

UNITED STATES PATENT OFFICE 2,142,290

DUCT RODDING EQUIPMENT

Harvey Francis Slocum, Long Branch, N. J., assignor to American Telephone and Telegraph Company, a corporation of New York Application December 24, 1937, Serial No. 181,709

1 Claim. (Cl. 287—119)

This invention relates to couplings for rods and the like, and more particularly to devices of this character which are used for duct rodding operations in underground conduits.

One of the objects of this invention is to provide duct rodding apparatus which may be easily and reliably coupled together.

Another object is to provide duct rodding apparatus of comparatively light weight and flexibility.

These and further objects will be apparent from the following description, when considered in connection with the accompanying drawing in which one embodiment of the invention is illustrated.

Referring to the drawing, Figure 1 is a sectional view of one element of a coupling taken on the line 1—1 of Fig. 2.

In accordance with this invention there is provided a series of removably connected rods which may be inserted in conduit ducts at distant manholes and advanced toward each other Elements are provided on the front ends of the oppositely approaching series of rods which are pushed together to form a coupling to secure the two series of rods in interlocked engagement with each other. When thus secured the two series of rods may be pushed backwardly and forwardly in the conduit ducts. Obstructions in the ducts which might damage cables to be installed therein may be cleared away by these rodding operations. The rods also serve to draw wire through the ducts by which cables are afterwards installed.

Figure 5:
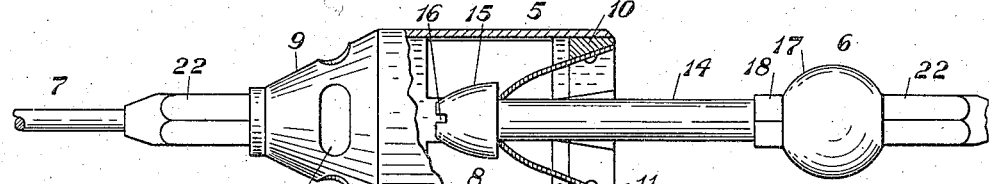
Fig. 5 is an elevation partly in section showing the two elements in coupled position.

In the drawing the reference character 5 designates one element of a coupling and the character 6 designates the other or companion element of the coupling. These elements are adapted to be moved into interlocked engagement, as shown in Fig. 5, by push rods 7 which are introduced into their threaded ends as will be presently described. The various elements just enumerated are made of suitable metal throughout.

The element 5 of the coupling is of generally tubular shape and a chamber portion 8 of this element extends from a conical head 9 outwardly toward its open end. A band 10 is provided in the chamber at its open end which has countersunk slots cut therein. These slots form seats for the ends of springs 11, which are shown for the purpose of illustration as being four in number. Rivets passing through the tubular casing and through the springs serve to maintain them in position on their seats. The springs 11 are of arcuate formation and taper slightly toward their inner ends in the chamber. When the springs are in position, a relatively small space is provided between their converging ends. Longitudinal slots and holes 12 may be cut through the tubular casing to lessen its weight, and to permit the escape of mud, sand or other deposits. The end of the conical portion 9 may be threaded, as shown at 13, for engagement with the push rod 7. Entrance may be had to the engaged end or head of the companion element 6, when it is in interlocked position, as shown in Fig. 5, through the holes 12 or through the threaded opening 13.

Figure 6:
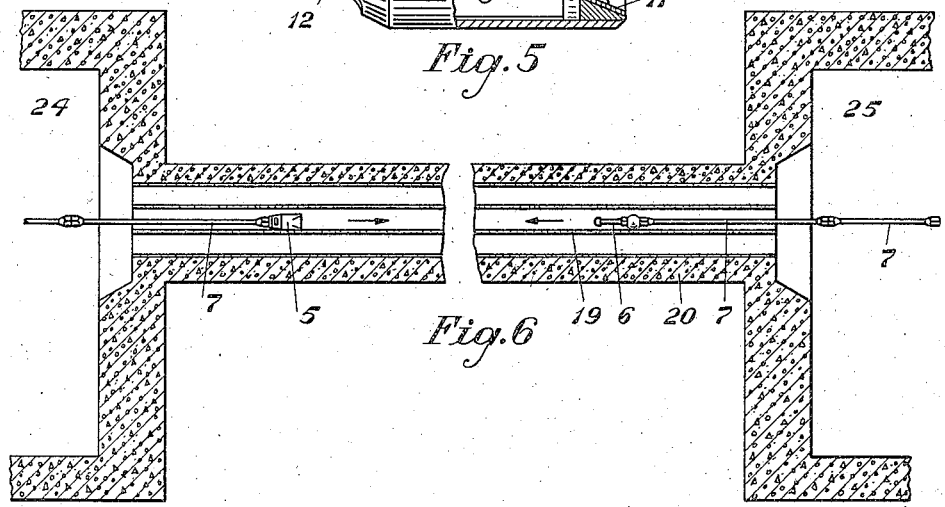
Fig. 6 is a diagrammatic view in section of an underground conduit showing a duct extending between adjacent manholes and with the improved duct rodding apparatus in position therein.

The element 6 of the coupling comprises a shank 14 which is threaded at each end. A generally conical-shaped head 15 is carried on one end of the shank and is provided with a slot 16. A spheroidal head 17 and a nut 18 are carried on the other end of the shank. The head 17 is of larger diameter than the head 15. The diameter of the tubular casing of the coupling element 5 and the diameter of the spheroidal head 17 of the coupling element 6 are such that when the casing and head are in position and advanced toward each other along the floor of a duct 19 of conduit 20 (Fig. 6) the head 15 of the coupling element 6 will be substantially centered with respect to the opening in the coupling element 5. Thus, when the two coupling elements are pushed together by the rods 7, the interlocking engagement between the head 15 and the springs 11 is facilitated and assured. The shape of the head 15 and the arrangement and positioning of the springs 11 also aid in this respect.

Figure 1:
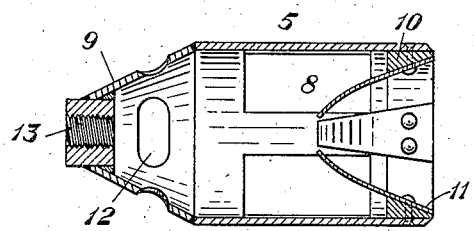
Figure 2:
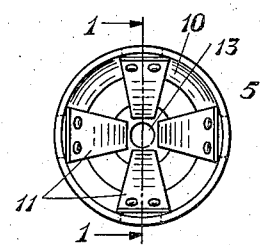
Fig. 2 is an end elevation of the coupling elements shown in Fig. 1.
Figure 3:
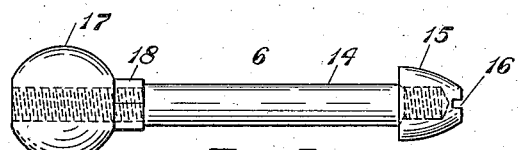
Fig. 3 is a side elevation of the other or second element of the coupling.
Figure 4:
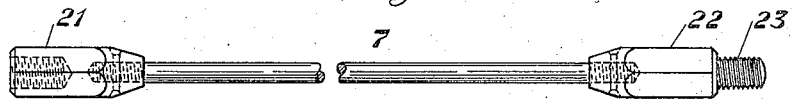
Fig. 4 is an elevation of one of a series of push rods which are adapted to be attached to each of the elements of the coupling whereby the elements are advanced toward each other from opposite ends of a conduit and into interlocked or coupled relation.

The push rods 7, as more clearly shown in Fig. 4, are threaded at each end and coupling nuts 21 and 22 are adapted to engage these threaded ends. The coupling-nut 21 has two threaded apertures, one of which engages the threaded end of the rod 7, and the other one of which is adapted to be engaged by the bolt-end 23 of the coupling-nut 22. As each push rod carries coupling-nuts 21 and 22, as illustrated, a series of these rods may be connected together in an obvious manner. It will also be apparent that the bolt end 23 of a coupling-nut 22 may be attached to the threaded end 13 of the coupling element 5 or to the threaded opening of the spheroidal head 17 of the coupling element 6. Thus by means of these rods the coupling element 5 may be advanced from the manhole 24 through the duct 20 toward the coupling element 6, and the coupling element 6 may be advanced from the manhole 25 through said duct in a direction toward the element 5. Additional push rods, of course, are added to the series as the elements 5 and 6 are advanced toward each other in the duct. When the two elements meet and are forced into interlocked engagement, as previously described, the duct rodding operations may be carried on and the rodding equipment comprising the two series of coupled push rods may be pushed back and forth between the manholes 24 and 25, or the more distant manholes of the chain. When the tests of the conditions in the ducts or the clearance of obstructions therein or other operations have been completed, the rod equipment may be dismantled by unscrewing the push rods from each other and from the elements 5 and 6 of the coupling. The elements 5 and 6 may be disconnected by the application of a screw driver through one of the openings 12 in the element 5 to engage and unscrew the head 15 from the shank 14 of the element 6. The coupling element 6 may be thus released from its interlocked engagement with the coupling element 5, and the unscrewed head 15 may be removed from the chamber 8 through the cutaway openings in the tubular casing. The head 15 of course may be restored to its shank 14 for further use.

While there is shown and described herein one preferred form of the invention by way of illustration, it will be understood that it is not limited or confined to the precise details of construction herein described and delineated, as modification and variation may be made within the scope of the appended claim without departing from the spirit of the invention.

What is claimed is:

In apparatus for rodding ducts, a coupling comprising two elements adapted to be united in a duct, one element having a tubular casing with inwardly extending springs converging to form a relatively small opening and the other element having a substantially conical-shaped removable head and a substantially spheroidal-shaped portion spaced therefrom, said conical-shaped head being adapted to be inserted through the opening to engage said springs and hold the elements in interlocked relation, and said spheroidal-shaped portion being of such diameter as to hold the conical head in spaced relation from the walls of the duct and thereby substantially center said head in the tubular casing to facilitate its interlocking engagement with said springs, said tubular casing having openings through which access may be had to remove said conical-shaped head and release the elements from interlocked engagement.

HARVEY F. SLOCUM.